United States Patent [19]

Tokuhara

[11] Patent Number: 4,793,699
[45] Date of Patent: Dec. 27, 1988

[54] PROJECTION APPARATUS PROVIDED WITH AN ELECTRO-MECHANICAL TRANSDUCER ELEMENT

[75] Inventor: Mitsuhiro Tokuhara, Chigasaki, Japan

[73] Assignee: Canon Kabushiki Kaisha, Tokyo, Japan

[21] Appl. No.: 180,618

[22] Filed: Apr. 4, 1988

Related U.S. Application Data

[63] Continuation of Ser. No. 853,164, Apr. 17, 1986, abandoned.

[30] Foreign Application Priority Data

Apr. 19, 1985 [JP] Japan .................................. 60-85183
Apr. 19, 1985 [JP] Japan .................................. 60-85187

[51] Int. Cl.$^4$ .......................................... G02B 26/08
[52] U.S. Cl. ..................................... 350/487; 350/6.6
[58] Field of Search .................. 350/6.6, 360, 487, 632

[56] References Cited

U.S. PATENT DOCUMENTS

3,746,911  7/1973  Nathanson et al. ................. 350/361
4,592,628  6/1986  Altman et al. ...................... 350/360

Primary Examiner—John K. Corbin
Assistant Examiner—Ronald M. Kachmarik
Attorney, Agent, or Firm—Fitzpatrick, Cella, Harper & Scinto

[57] ABSTRACT

A projection apparatus comprises a light source, a light scanning optical system including an electro-mechanical transducer element having at least one mirror row comprising a plurality of movable mirrors capable of deflecting the light beam from the light source in at least two directions and arranged in a direction corresponding to the main scan direction, a driving device for putting out a signal for driving the movable mirrors, the movable mirrors deflecting the light beam in response to the signal, and a light-receiving member by which the light applied from the light scanning optical system is subsidiary-scanned, at least one of the shape and arrangement of the mirrors and the subsidiary scan pitch being set so that light dots adjacent to each other in at least one of the main scan direction and the subsidiary scan direction in the pattern of light dots formed on the light-receiving member by the deflected light from the movable mirrors of the mirror row overlap each other to a sufficient degree to obtain a sufficiently good quality of image.

17 Claims, 8 Drawing Sheets

FIG.3C PRIOR ART 
$I_{max}$ $I_{min}$

FIG.13A 
Imax  (Imax/2)

FIG.13B 
(Imax/2)  Imax

FIG.13C

PROJECTION APPARATUS PROVIDED WITH AN ELECTRO-MECHANICAL TRANSDUCER ELEMENT

This application is a continuation of application Ser. No. 853,164 filed Apr. 17, 1986, now abandoned.

BACKGROUND OF THE INVENTION

1. Field of the Invention

This invention relates to a projection apparatus, and in particular to a projection apparatus for effecting image formation by the use of a light scanning optical system including an electro-mechanical transducer element having a number of minute movable mirrors. As such a projection apparatus, there is a recording apparatus or a display apparatus.

2. Related Background Art

For example, DMD (deformable mirror device) is known as an electro-mechanical transducer element having the minute movable mirrors as described above.

DMD is described in *IEE Transaction on Electron Device*, Vol. ED-30, No. 5544(1983), and the optical system thereof is disclosed in U.S. Pat. No. 4,454,547.

Figure 1:
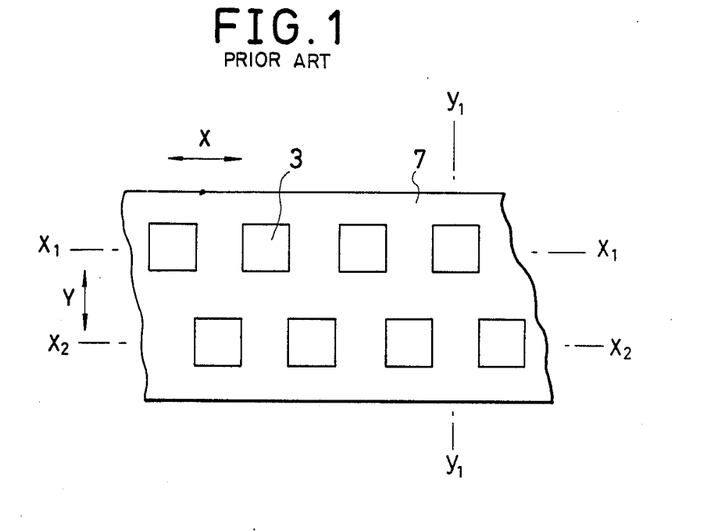
FIG. 1 is a fragmentary plan view of the DMD of a recording apparatus.

FIG. 1 of the accompanying drawings is a fragmentary plan view of DMD 7, and reference numeral 3 designates mirrors. When each mirror is in its ON state, the reflected light from the mirror is applied to the surface of a photosensitive medium so that the direction X corresponds to the direction of the rotational axis of the photosensitive medium and the direction Y corresponds to the direction of rotation of the photosensitive medium. That is, the direction X is a direction corresponding to the main scan direction and the direction Y is a direction corresponding to the subsidiary scan direction.

Now, in the conventional DMD, as shown in FIG. 1, two mirror rows have been formed in the direction X with the same spacing as the length of each mirror in the direction X being kept between the mirrors, and the mirrors have been disposed in such a staggered pattern that the two mirror rows do not overlap each other in the direction Y. The two mirror rows have been spaced apart from each other in the direction Y while keeping therebetween the same spacing as the length of the mirror 3 in the direction Y, and subsidiary scanning has been effected at a pitch corresponding to this spacing.

Accordingly, if the DMD and the light scanning optical system are geometro-optically ideal, when all mirrors are in their ON state, subsidiary scanning is effected at a pitch corresponding to the length of the mirror in the direction Y, whereby light dots by the reflected light from the mirrors ought to be formed on the surface of the photosensitive medium without overlapping one another and without any slipping portion. By suitably setting a signal input to a DMD driving circuit, a suitable mirror is caused to be ON-OFF at a suitable time, whereby a desired image ought to be formed on the surface of the photosensitive medium.

In reality, however, there occurs the divergence of reflected light by the curvature of the mirrors of DMD (that is, ideally, only the hinge portions of the mirrors may be curved, but actually the whole of the mirrors 3 is curved) and there also occurs the divergence of light by the aberrations of the other optical system than DMD and further, in DMD, the phenomenon of diffraction occurs because of the mirrors being minute and therefore, the intensity of light of each light dot which the reflected light by the mirrors of DMD forms on the photosensitive medium has such a distribution that in each dot, the central portion is large and the marginal portion is small.

Figure 2A:
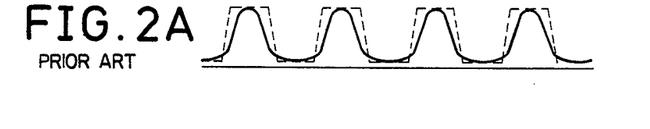
FIGS. 2A, 2B and 2C are graphs showing the quantity-of-light distributions of light dot patterns in the main scan direction.
Figure 2B:
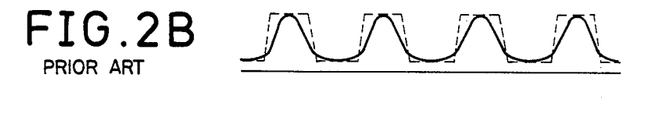

FIGS. 2A and 2B of the accompanying drawings are graphs showing the quantity-of-light distribution in the light dot portion on the surface of the photosensitive medium corresponding to the portion along line $x_1-x_1$ of the first row of mirror arrays and the light dot portion corresponding to the portion along line $x_2-x_2$ of the second row of mirror arrays when all the mirrors of DMD are in their ON state.

When there are only the aberrations of the other optical system than DMD, there are provided such distributions as indicated by dotted lines in FIGS. 2A and 2B, but in reality, as described above, on the basis of various causes, there are provided such distributions as indicated by solid lines in FIGS. 2A and 2B.

Figure 2C:
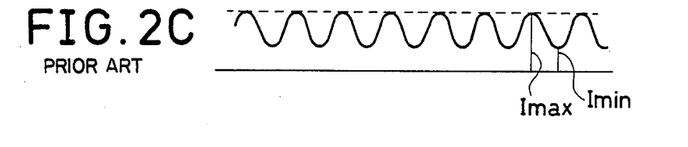

So, if the light dots formed by the first row of mirror arrays and the second row of mirror arrays on the same main scan line on the photosensitive medium at different points of time are combined together, the quantity-of-light distribution thereof will be such as shown in FIG. 2C of the accompanying drawings. When there are only the aberrations by the other optical system than DMD, there is provided a generally uniform quantity of-light distribution as indicated by dotted line, but in reality, there is provided a non-uniform distribution as indicated by solid line.

If the uniformity of this quantity-of-light distribution is aggravated and $(I_{max}-I_{min})/(I_{max}+I_{min})$ exceeds the order of 0.05, irregularity will appear in an image developed by a developing device. Depending on the type of development, such irregularity will appear as a black fringe in the subsidiary scan direction in a white solid image or a white fringe in the subsidiary scan direction in a black solid image.

A similar phenomenon also occurs to the quantity-of-light distribution in the light dot portion corresponding to the portion along line $y_1-y_1$ of the mirror 3.

Figure 3A:
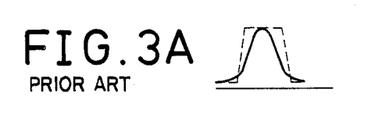
FIGS. 3A, 3B and 3C are graphs showing the quantity-of-light distributions of light dot patterns in the subsidiary scan direction.

FIG. 3A of the accompanying drawings is a graph showing the quantity-of-light distribution in the light dot portion on the surface of the photosensitive medium corresponding to the portion along line $y_1-y_1$ of the mirror when the mirrors of DMD are in their ON state.

When, as described previously, there are only the aberrations of the other optical system than DMD, there is provided such a distribution as indicated by dotted line in FIG. 3A, but in reality, as described above, on the basis of various causes, there is provided such a distribution as indicated by solid line in FIG. 3A.

Figure 3B:
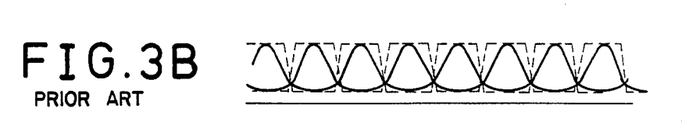

FIG. 3B of the accompanying drawing shows the state of superposition of the light dot of FIG. 3A in the portion on the surface of the photosensitive medium corresponding to the portion along line $y_1-y_1$ of the mirror 3 when subsidiary scanning is effected with the mirrors of DMD being in their ON state.

Figure 3C:
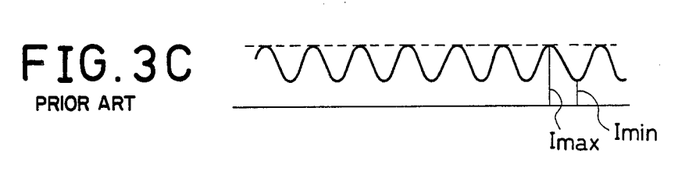

FIG. 3C of the accompanying drawings shows a quantity-of-light distribution in which the light dot distributions shown in FIG. 3B are combined together. When, as described previously, there are only the aberrations by the other optical system than DMD, there is provided a generally uniform quantity-of-light distribution as indicated by dotted line, but in reality, there is provide a non-uniform distribution as indicated by solid line.

If the uniformity of this quantity-of-light distribution is aggravated and $(I_{max}-I_{min})/(I_{max}+I_{min})$ exceeds the order of 0.05, irregularity will appear in the image developed by the developing device. Depending on the type of development, such irregularity will appear as a black fringe in the main scan direction in a white solid image or a white fringe in the main scan direction in a black solid image.

Thus, a recording apparatus using a light scanning optical system including the DMD as described above has suffered from a problem that print of good quality cannot be obtained.

Such a problem occurs not only to a recording apparatus, but also to other projection apparatus such as a display apparatus. In the case of a display apparatus, a suitable display screen is used instead of the photosensitive medium in the recording apparatus, and subsidiary scanning is generally effected with the display screen being fixed and with the position of the light application from the optical system being moved.

SUMMARY OF THE INVENTION

It is therefore an object of the present invention to provide a projection apparatus which is capable of forming good images.

For the purpose of solving the above-noted problems peculiar to the prior art, according to the present invention, there is provided a projection apparatus characterized in that at least one of the shape and arrangement of the movable mirrors of each mirror row and the subsidiary scan pitch is determined so that light dots adjacent to each other in at least one of the subsidiary scan direction and the main scan direction sufficiently overlap each other in a pattern of light dots which the reflected light from the movable mirrors forms on a light-receiving member with the subsidiary scanning.

DESCRIPTION OF THE PREFERRED EMBODIMENTS

Figure 4A:
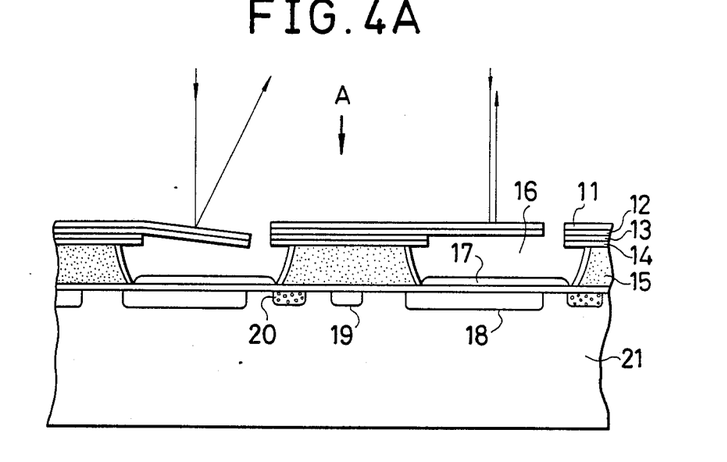
FIGS. 4A, 4B and 4C illustrate the DMD.

The mechanism of DMD will first be described with reference to the drawings. FIG. 4A is an enlarged cross-sectional view of DMD. Reference numeral 11 designates a mirror surface which is formed of a substance such as Al or Ag and performs the function of reflecting an incident light. Reference numeral 12 denotes a substrate which supports the mirror surface 11 and which is formed of Au or the like. Reference numerals 13 and 14 designate supporting members for a mirror portion comprising the mirror surface 11 and the substrate 12. The supporting member 13 is called a mirror contact which particularly receives a hinge portion effecting an electro-mechanical operation, and the supporting member 14 is formed of an insulating substance of polyoxide Si. Reference numeral 15 denotes a polysilicon gate which performs the function as the gate of MOSFET. Reference numeral 16 designates an air gap which is a cavity of $0.6\mu$ to several $\mu$. Reference numeral 17 denotes a floating field plate to which a voltage is applied from an N+ floating source 18 by the ON-OFF information of a transistor. Reference numeral 19 designates an N+ drain. This also performs the function of the construction of an MOS type FET transistor. Reference numeral 20 denotes a gate oxide, and reference numeral 21 designates a P type silicon substrate.

Figure 4B:
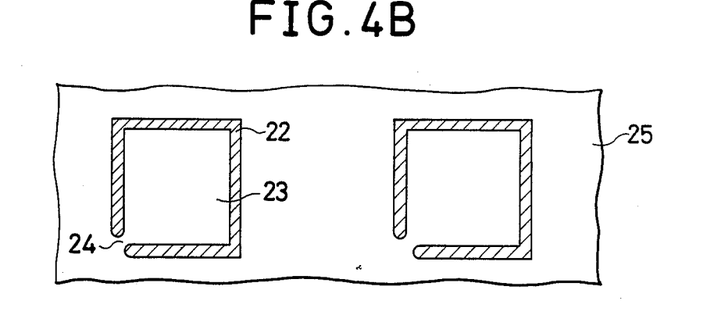

FIG. 4B is an enlarged front view taken from the direction of arrow A in FIG. 4A. Reference numeral 22 designates an air clearance, reference numeral 23 denotes a mirror oscillation portion (hereinafter simply referred to as the mirror) which oscillates electromechanically, and reference numeral 24 designates a hinge portion. Reference numeral 25 denotes the other mirror surface of the DMD surface than the mirror 23. DMD is made by a process similar to the process of making IC or LSI.

Figure 4C:
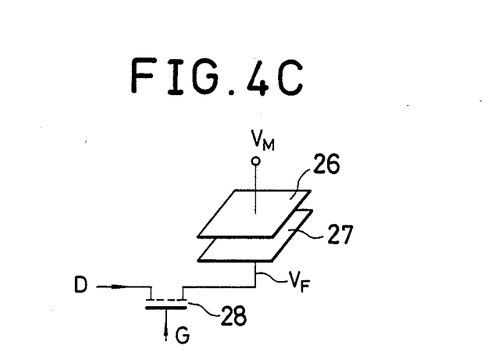

FIG. 4C shows an electrical equivant view of DMD. Reference numeral 26 designates the equivalent portion of the mirror portions 11 and 12 to which a voltage $V_M$ is applied. Reference numeral 27 denotes the equivalent portion of the N+ floating source 18 to which a voltage $V_F$ is applied. Reference numeral 28 designates a transistor construction. The voltage $V_F$ is switched on and off to the N+ floating source 18 by ON and OFF of the D (drain) signal of the N+ drain 19 and the G (gate) signal of the gate 15. At this time, the voltage $V_M$ is applied to the mirror portions 11 and 12, and the potential difference is increased or decreased between the mirror portions 11, 12 and the source 18 by ON-OFF signal. In conformity with this potential difference, there is produced between the mirror portions 11, 12 and the plate 17 a force F corresponding to the following formula:

$$F \sim KV^\alpha$$

(K: constant, V: potential difference, $\alpha$: constant, F: bending force)
and the mirror portions 11 and 12 are pivotally moved about the hinge portion 24.

The left portion of FIG. 4A shows a case where there is a great voltage difference between the mirror portions 11, 12 and the source 18, and the mirror 23 is bent from the hinge portion 24 and by this action, the incident light is reflected while changing an angle twice the angle of deviation of the mirror 23.

On the other hand, when the voltage difference is small, as shown in the right portion of FIG. 4A, the force with which the mirror 23 of the mirror portions 11, 12 is pulled by the plate 17 is small and thus, the mirror 23 is not curved. Accordingly, the incident light is reflected without the mirror being deviated. DMD converts electrical ON and OFF into the ON and OFF of the oscillation of the mirror 23 and further converts them into the angle of deviation of light.

Figure 5:
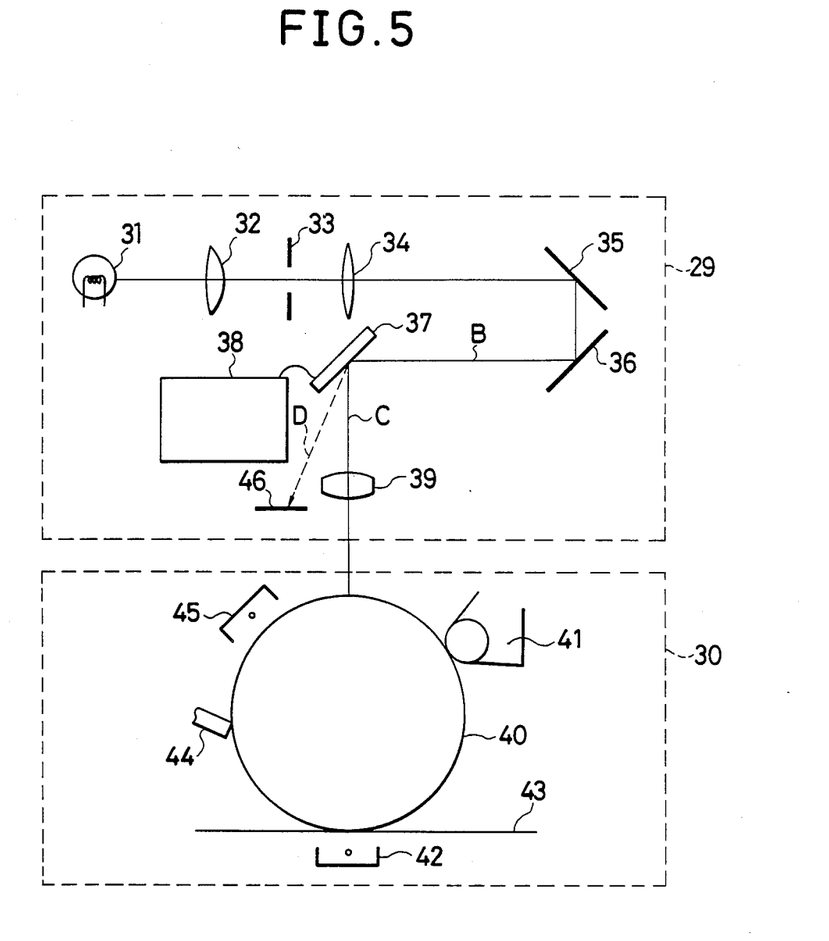
FIG. 5 shows the construction of a recording apparatus.

FIG. 5 shows a recording apparatus utilizing a light scanning optical system including the DMD as described above.

In FIG. 5, reference numeral 29 designates the light scanning optical system, and reference numeral 30 denotes an electrophotographic process apparatus. These together constitute a printer.

Reference numeral 31 designates a lamp, reference numerals 32 and 34 denote optical systems for illuminating DMD, and reference numeral 33 designates a slit plate for the optical systems 32, 34. The slit plate 33 is designed to illuminate only the mirror array portion of DMD. Reference numerals 35 and 36 denote bending mirrors, and reference numeral 37 designates DMD which effects an electro-mechanical operation by the principle of FIGS. 4A–4C.

Reference numeral 38 designates a circuit for driving the DMD 37, and reference numeral 39 denotes a lens for imaging the reflected light from the DMD 37 on a photosensitive medium 40. Usually, only when a signal has entered each mirror 23 of the DMD 37, the reflected light from the mirror 23 enters the pupil of the imaging lens 39.

Reference numerals 41–45 designate devices usually used in the electrophotographic process. That is, reference numeral 41 denotes a developing device, reference numeral 42 designates a charger for transferring the toner on the photosensitive medium 40 onto copying paper 43, reference numeral 44 denotes a cleaner, and reference numeral 45 designate a charger for imparting charge to the photosensitive medium 40. Reference numeral 46 denotes a light-intercepting plate for cutting the OFF signal light of DMD.

The function as a printer is performed by a signal input to the DMD element driving circuit 38 imparting a command input to the DMD 37. The DMD 37 electromechanically reacts in accordance with the operation principle shown in FIGS. 4A-4C in response to a signal, and the mirror 23 is pivotally moved. The light B of the illuminating system emitted from the lamp 31 illuminates the mirror array portion of the DMD 37 in a slit-like form through the illuminating optical systems 32, 33, 34, 35, 36. When the individual mirrors 23 of the mirror array on the DMD 37 are in their OFF state, the light B applied travels toward the reflected light D reflected by the mirrors 23 and is intercepted by the light intercepting plate 46, and no light reaches the photosensitive medium 40. When the mirrors 23 are in their ON state, the light is reflected in a direction C and enters the imaging lens 39, and a dot pattern corresponding to the mirrors 23 is formed on the photosensitive medium 40. Accordingly, if line-like ON and OFF signals are input to the driving circuit 38, development is effected via the electrophotographic process, whereafter the function as a printer in which the toner image is transferred onto the copying paper 43 takes place.

Figure 6:
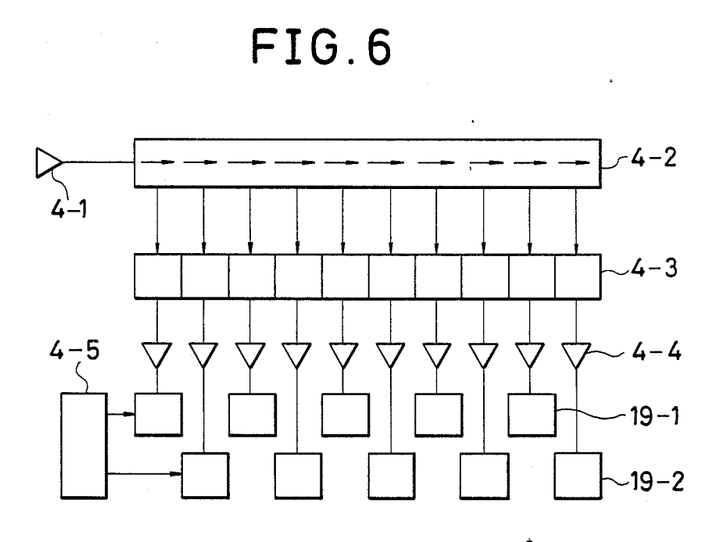
FIG. 6 shows the construction of a DMD driving circuit.

Also, a circuit shown in FIG. 6 is usually used as the driving circuit 38 shown in FIG. 5. Reference numeral 4-1 designates an input signal amplifier. In the case of a binary signal, the amplifier 4-1 is ON or OFF, and in the case of an analog signal, it puts out a voltage corresponding to the amount thereof. The signal is usually input in series and therefore is converted into parallel signals corresponding to the number of the mirrors 23 the DMD 37 by a simipara exchanger 4-2, add the parallel signals are stored in a register 4-3. Those signals corresponding to a row are read out by a synchronizing signal, and via an amplifer 4-4, a predetermined voltage signal is applied to the two rows of drains 19-1 and 19-2 of the DMD 37. On the other hand, in response to said synchronizing signal, a gate signal is imparted to the gate 15 of the DMD 37 by a decoder 4-5. Depending on the amount of this drain signal and the presence or absence of such signal and depending on the presence or absence of a gate signal in each row, the voltage of the floating source 18 of the DMD 37 is transmitted to the floating field plate 17, whereby the selection of ON or OFF of the pivotal movement of the mirrors 23 is effected.

Figure 7:
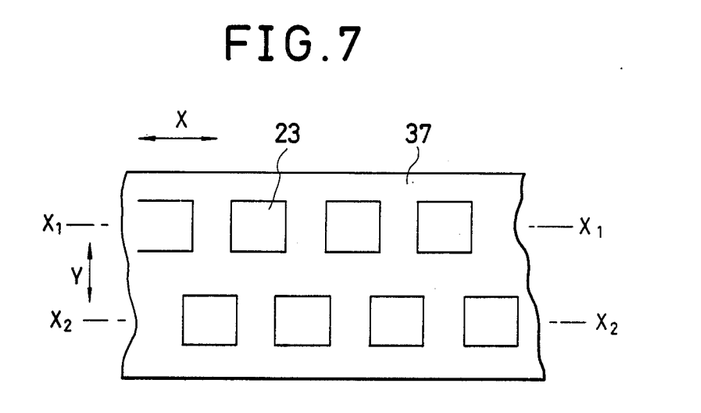
FIG. 7 is a fragmentary plan view of a DMD according to the present invention.

FIG. 7 is a schematic fragmentary plan view of DMD 37 in a first embodiment of the projection apparatus according to the present invention.

As shown in FIG. 7, in the apparatus of the present embodiment, the length of each mirror 23 of the DMD 37 in a direction corresponding to the main scan direction, i.e., in the direction X, is greater than the arrangement pitch of the mirrors in the direction X. The first row of mirror arrays and the second row of mirror arrays are disposed in staggered relationship while being deviated from one another by a half of the mirror arrangement pitch in the direction X.

Also, in the apparatus of the present embodiment, the first row of mirror arrays and the second row of mirror arrays are spaced apart from one another by a length corresponding to the subsidiary scan pitch, i.e., the length of each mirror 23 in the direction Y.

Figure 8:
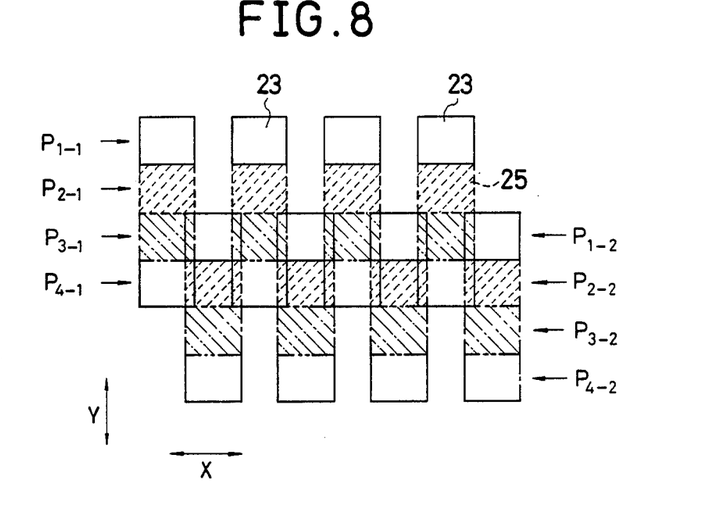
FIGS. 8 and 9 show a state in which mirror arrangement patterns are superposed one upon another.

Accordingly, if the mirror arrangement patterns of the DMD 37 in the apparatus of the present embodiment are moved successively in the direction Y at a pitch corresponding to the subsidiary scan pitch and the mirror arrangement patterns are superposed one upon another, the result will be such as shown in FIG. 8. In FIG. 8, $P_{1-1}$ and $P_{1-2}$ are the mirror arrangement patterns at the initial position, and $P_{1-1}$ corresponds to the first row of mirror arrays and $P_{1-2}$ corresponds to the second row of mirror arrays. The patterns resulting from $P_{1-1}$ and $P_{1-2}$ being moved in the direction Y by a distance corresponding to the subsidiary scan pitch are $P_{2-1}$ and $P_{2-2}$, and the patterns resulting from these being successively moved in the direction Y by a distance corresponding to the subsidiary scan pitch are $P_{3-1}$, $P_{3-2}$ and $P_{4-1}$, $P_{4-2}$.

Figure 10A:
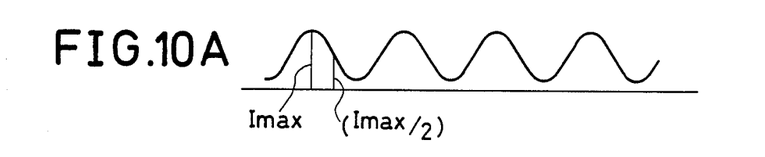
FIGS. 10A, 10B and 10C are graphs showing the quantity-of-light distributions of light dot patterns in the main scan direction in first and second embodiments of the present invention.
Figure 10B:
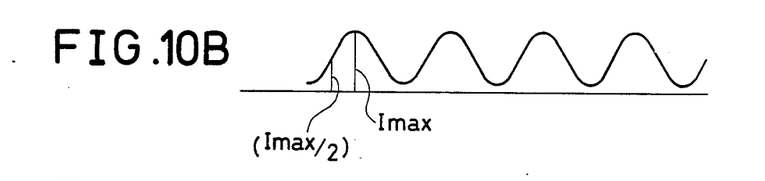

FIGS. 10A and 10B are graphs showing the quantity-of-light distributions of a light dot portion on the surface of the photosensitive medium 40 corresponding to the portion along the line $x_1$—$x_1$ of the first row of mirror arrays and a light dot portion corresponding to the portion along the line $x_2$—$x_2$ of the second row of mirror arrays when all the mirrors 23 of the DMD 37 are in their ON state. As shown in these graphs, the quantity-of-light distribution of the light dot on the surface of the photo sensitive medium 40 in the present embodiment is such that as in the conventional apparatus, the intensity of the central portion is great and the intensity of the marginal portion is small. However, in the present embodiment, the length of each mirror 23 in the direction X is greater than in the conventional apparatus and therefore, the portion which is great in intensity is relatively wide. A portion of about a half of the intensity $I_{max}$ just lies on the portion in which a light dot row formed by the reflection on the first row of mirror arrays overlaps a light dot row formed by the reflection on the second row of mirror arrays.

Figure 10C:
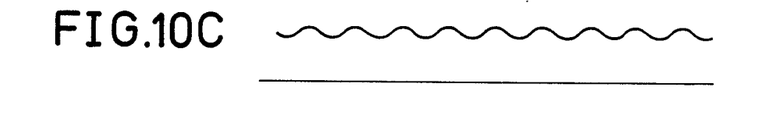

If the light dots formed at different points of time on the same main scanning line on the photo sensitive medium 40 by the first row of mirror arrays and the second row of mirror arrays are combined together, the quantity-of-light distribution thereof will be such as shown in FIG. 10C. In this quantity-of-light distribution, the condition that $(I_{max}-I_{min})/(I_{max}+I_{max}+I_{min})<0.05$ is sufficiently satisfied. As can be seen in this graph, in the solid image formed by the apparatus of the present embodiment, the uniformity of the quantity-of-light distribution is very good. Therefore, no white or black fringe appears in the subsidiary scan direction.

Figure 9:
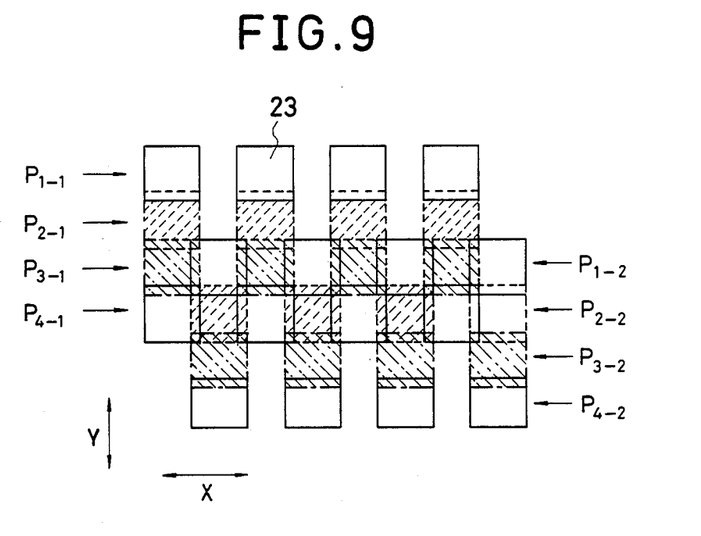

In the above-described embodiment, an example has been shown which has such shape and arrangement of the mirrors 23 that only the end portions of the mirrors 23 in the direction X, i.e., the direction corresponding to the main scan direction, overlap one another as shown in FIG. 8 when the mirror arrangement patterns of the DMD 37 are successively moved in the direction Y at a pitch corresponding to the subsidiary scan pitch and the mirror arrangement patterns are superposed one upon another, but the present invention may likewise have such shape and arrangement of the mirrors that the end portions of the mirrors in the direction Y, i.e., the direction corresponding to the subsidiary scan direction, also overlap one another when the mirror arrangement patterns are superposed one upon another. For this purpose, the subsidiary scan pitch equal to the spacing between the rows of mirrors may be made shorter than the length of each mirror 23 in the direction corresponding to the subsidiary scan direction. The state in which such mirror arrangement patterns in a second embodiment are superposed one upon another is shown in FIG. 9.

According to the second embodiment, no white or black fringe appears in either the main scan direction or the subsidiary scan direction.

Figure 11:
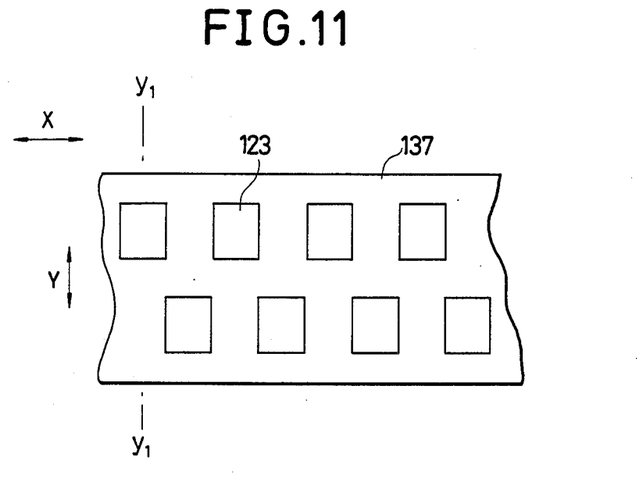
FIG. 11 is a fragmentary plan view of another DMD according to the present invention.

FIG. 11 is a schematic fragmentary plan view of DMD 137 in a third embodiment of the projection apparatus according to the present invention. The apparatus of this embodiment was also embodied as a printer which is a recording apparatus having a construction similar to what has been described above, and the components thereof need not be described.

As shown in FIG. 11, in the apparatus of the present embodiment, the length of each mirror 123 of the DMD 137 in the direction corresponding in the main scan direction, i.e., in the direction X, is the same as the mirror arrangement pitch in the direction X. The first row of mirror arrays and the second row of mirror arrays are disposed in staggered relationship while being deviated from one another by a half of the mirror arrangement pitch in the direction X.

Also, in the apparatus of the present embodiment, the first row of mirror arrays and the second row of mirror arrays are spaced apart from one another by a length shorter than the length corresponding to the subsidiary scan pitch.

Figure 12:
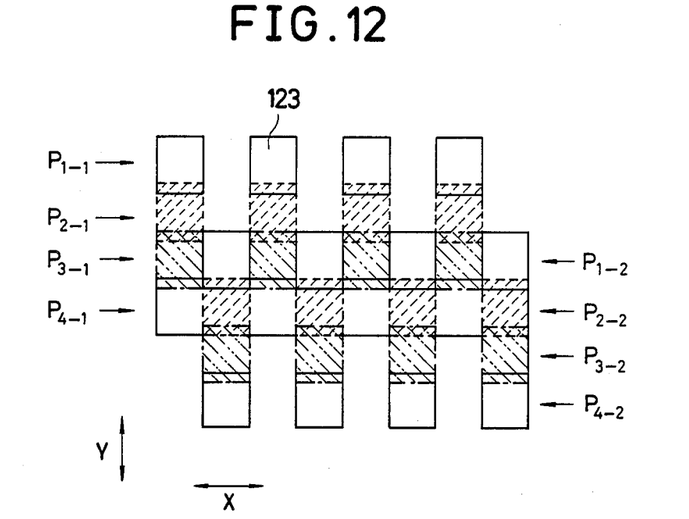
FIG. 12 shows a state in which other mirror arrangement patterns are superposed one upon another.

Accordingly, if the mirror arrangement patterns of the DMD 137 of the apparatus of the present embodiment are successively moved in the direction Y at a pitch corresponding to the subsidiary scan pitch and the mirror arrangement patterns are superposed one upon another, the result will be such as shown in FIG. 12. In FIG. 12, $P_{1-1}$ and $P_{1-2}$ are the mirror arrangement patterns at the initial position, and $P_{1-1}$ corresponds to the first row of mirrors arrays and $P_{1-2}$ corresponds to the second row of mirror arrays. The patterns resulting from $P_{1-1}$ and $P_{1-2}$ being moved in the direction Y by a distance corresponding to the subsidiary scan pitch are $P_{2-1}$ and $P_{2-2}$, and the patterns resulting from these being successively moved in the direction Y by a distance corresponding to the subsidiary scan pitch are $P_{3-1}$, $P_{3-2}$ and $P_{4-1}$, $P_{4-2}$.

Figure 13A:
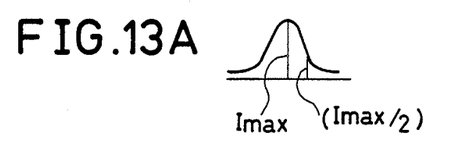
FIGS. 13A, 13B and 13C are graphs showing the quantity-of-light distributions of light dot patterns in the subsidiary scan direction in second and third embodiments of the present invention.

FIG. 13A is a graph showing the quantity-of-light distribution of a light dot portion on the surface of the photosensitive medium 40 corresponding to the portion along the line $y_1$—$y_1$ of the mirrors 123 of the DMD 137 when these mirrors are in their ON state.

Figure 13B:
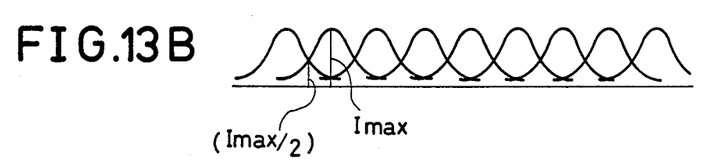

Also, FIG. 13B shows a state in which the light dot portions on the surface of the photosensitive medium 40 corresponding to the portion along the line $y_1$—$y_1$ of the mirrors 123 of the DMD 137 when subsidiary scanning is effected with the mirrors 123 being in their ON state are superposed one upon another. As shown in FIG. 13B, the quantity-of-light distribution of the light dot on the surface of the photosensitive medium in the present embodiment is such that as in the conventional apparatus, the intensity of the central portion is great and the intensity of the marginal portion is small. However, in the present embodiment, the length of each mirror in the direction Y relative to the subsidiary scan pitch is greater than in the conventional apparatus and therefore, the portion which is great in intensity is relatively wide. The portions of the adjacent light dots having about a half of intensity $I_{max}$ just overlap each other.

Figure 13C:
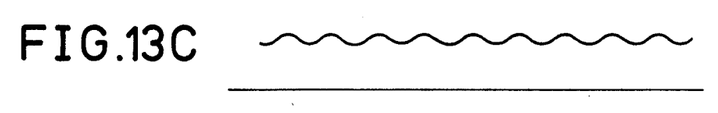

A quantity-of-light distribution in which the light dot distributions shown in FIG. 13B are combined together is shown in FIG. 13C. As can be seen from FIG. 13C, in a solid image formed by the apparatus of the present embodiment, the uniformity of the quantity-of-light distribution is very good. Therefore, no white or black fringe appears in the main scan direction. Where the mirror arrays are in a row, the subsidiary scan pitch may be made shorter than the length of each mirror in the direction corresponding to the subsidiary scan direction.

The foregoing description has been made with respect to a white solid image or a black solid image, but in the ordinary image as well, a similar effect is obtained in the white portion or the black portion of the image, whereby chapping of the image is eliminated.

Also, in the above-described embodiments, the mirror arrangement patterns are disposed in two staggered rows, but alternatively, the mirror arrays of electromechanical transducer elements in the present invention may be suitable patterns comprising one row or three or more rows. Again in such case, an effect similar to that described in the foregoing embodiments is obtained.

While the foregoing embodiments have been described with respect to a case where the projection apparatus is a recording apparatus, the present invention also covers a case where the projection apparatus is a display apparatus or the like.

What I claim is:
1. A projection apparatus comprising:
   a light source;
   an element having at least two deflection means rows each comprising a plurality of deflection means for deflecting light from said light source in at least two directions and arranged in a predetermined direction;

drive means for providing a signal for driving said deflection means, said deflection means deflecting said light in response to said signal; and a light-receiving member for receiving light from said deflection means, said light-receiving member being movable relative to said element in a subsidiary scan direction which traverses a main scan direction in which light dots are formed on said light-receiving member by said deflection means arranged in said predetermined direction, whereby the light from said deflection means is subsidiary-scanned on said light-receiving member;

wherein the spacing between the deflection means of one row in said predetermined direction is shorter than the length of said deflection means of the other row in said predetermined direction and said one row is deviated from said the other row by about a half of the length of a deflection means arrangement pitch in said predetermined direction so that the light dots adjacent to each other in said main scan direction overlap each other on the light-receiving member.

2. A projection apparatus according to claim 1, wherein the spacing between the two deflection means rows in a direction corresponding to the subsidiary scan direction is shorter than the length of said deflection means in this corresponding direction.

3. A projection apparatus according to claim 1, wherein the length of the light dots formed by the deflection means in a direction corresponding to the subsidiary scan direction is longer than a subsidiary scan pitch due to the relative movement between said element and said light-receiving member in the subsidiary scan direction.

4. A projection apparatus according to claim 1, wherein the difference between said spacing and said length is such that the uniformity of the quantity-of-light distribution of a pattern formed by the superposed light dots satisfies the condition that $$(I_{max}-I_{min})/I_{max}+I_{min}) < 0.05,$$

where $I_{max}$ and $I_{min}$ are the maximum quantity of light and the minimum quantity of light, respectively, in said pattern, 5. A projection apparatus according to claim 4, wherein the difference between said spacing and said length is such that patterns having about a half of the intensity of the adjacent light dots are at the same location.

6. A projection apparatus according to claim 1, wherein said light-receiving member is a photosensitive medium.

7. A projection apparatus according to claim 1, wherein said light-receiving member is a display screen.

8. A projection apparatus according to claim 1, wherein said light element is a light scanning optical system including an electro-mechanical transducer element and said deflection means is a movable mirror.

9. An electro-mechanical transducer element comprising:

at least two mirror rows including a plurality of movable mirrors capable of deflecting a light beam in at least two directions and arranged in a predetermined direction; and wherein the spacing between the mirrors of one row in said predetermined direction is shorter than the length of said mirrors of the other row in said predetermined direction and said one row is deviated from said the other row by about a half the length of a mirror arrangement pitch in said predetermined direction.

10. A projection apparatus comprising:

a light source;

an element having at least one deflection means row comprising a plurality of deflection means capable of deflecting light from said light source in at least two directions and arranged in a predetermined direction;

drive means for providing a signal for driving said deflection means, said deflection means deflecting said light in response to said signal; and a light-receiving member for receiving lights from said deflection means, said light-receiving member being movable relative to said element in a subsidiary scan direction which traverses a main scan direction in which light dots are formed on said light-receiving member by said deflection means arranged in said predetermined direction, whereby the light from said deflection means is subsidiary-scanned on said light-receiving member;

wherein the length of the light data formed by the deflection means in a direction corresponding to the subsidiary scan direction is longer than the length of a subsidiary scan pitch due to the relative movement between said element and said light-receiving member in the subsidiary scan direction so that the light dots adjacent to each other in said subsidiary scan direction overlap each other on said light-receiving member.

11. A projection apparatus according to claim 10, wherein said element is a light scanning optical system including an electro-mechanical transducer element and said deflection means is a movable mirror.

12. A projection apparatus according to claim 10, wherein the difference between said subsidiary scan pitch and said length is such that the uniformity of the quantity-of-light distribution of a pattern formed by the superposed light dots satisfies the condition that $$(I_{max}-I_{min})/(I_{max}+I_{min}) < 0.05,$$

where $I_{max}$ an $I_{min}$ are the maximum quantity of light and the minimum quantity of light, respectively, in said pattern.

13. A projection apparatus according to claim 12, wherein the difference between said subsidiary scan pitch and said length is such that portions having about a half of the intensity of the adjacent light dots are at the same location.

14. A projection apparatus according to claim 10, wherein said light-receiving member is a photosensitive medium.

15. A projection apparatus according to claim 10, wherein said light-receiving member is a display screen.

16. A projection apparatus comprising:

a light source;

an element having at least two modulating means rows each comprising a plurality of light modulating means for modulating light from said light source to selectively direct the light, said modulating means rows arranged in a predetermined direction;

drive means for providing a signal for driving said modulating means, said modulating means modulating said light in response to said signal; and a light-receiving member for receiving light from said modulating means, said light-receiving member being movable relative to the light from said modulating means in a subsidiary scan direction which traverses a main scan direction in which light dots are formed on said light-receiving member by said modulating means arranged in said predetermined direction, whereby the light from said modulating means is subsidiary-scanned on said light-receiving member;

wherein the spacing between the modulating means of one row in said predetermined direction is shorter than the length of said modulating means of the other row in said predetermined direction and said one row is deviated from said the other row by about a half the length of a modulating means arrangement pitch in said predetermined direction so that the light dots adjacent to each other in said main scan direction overlap each other on the light-receiving member.

17. A projection apparatus comprising:

a light source;

an element having at least one modulating means row comprising a plurality of modulating means for modulating light from said light source to selectively direct the light and arranged in a predetermined direction;

drive means for providing a signal for driving said modulating means, said modulating means modulating said light in response to said signal; and a light-receiving member for receiving light from said modulating means, said light-receiving member being movable relatively to said the light from said modulating means in a subsidiary scan direction which traverses a main scan direction in which light dots are formed on said receiving member by said modulating means arranged in said predetermined direction, whereby the light from said modulating means is subsidiary-scanned on said light-receiving member;

wherein the length of the light dots formed by the modulating means in a direction corresponding to the subsidiary scan direction is longer than the length of a subsidiary scan pitch due to the relative movement between said light and said light-receiving member in the subsidiary scan direction so that the light dots adjacent to each other in said subsidiary scan direction overlap each other on said light-receiving member.

* * * * *

UNITED STATES PATENT AND TRADEMARK OFFICE
CERTIFICATE OF CORRECTION

PATENT NO. : 4,793,699

DATED : December 27, 1988

INVENTOR(S) : Mitsuhiro Tokuhara

It is certified that error appears in the above-identified patent and that said Letters Patent is hereby corrected as shown below:

COLUMN 2

Line 26, "quantity of-light" should read --quantity-of-light--.
    Line 65, "provide" should read --provided--.

COLUMN 4

Line 39, "equivant" should read --equivalent--.
    Line 45, ""$V_f$is should read --$V_f$ is--.

COLUMN 5

Line 39, "designate" should read --designates--.

UNITED STATES PATENT AND TRADEMARK OFFICE
CERTIFICATE OF CORRECTION

PATENT NO. : 4,793,699
DATED : December 27, 1988
INVENTOR(S) : Mitsuhiro Tokuhara It is certified that error appears in the above-identified patent and that said Letters Patent is hereby corrected as shown below:

COLUMN 6

Line 6, "the DMD 37" should read --of the DMD 37--; and "add" should read --and--.
Line 63, "photo sensitive medium 40" should read --photosensitive medium 40--.

COLUMN 7

Line 8, "photo sensitive medium 40" should read --photosensitive medium 40--.
Line 13, "$(I_{max}-I_{min})/(I_{max}+I_{max}+I_{min})<0.05$" should read --$(I_{max}-I_{min})/(I_{max}+I_{min})<0.05$--.
Line 53, "corresponding in" should read --corresponding to--.

UNITED STATES PATENT AND TRADEMARK OFFICE
CERTIFICATE OF CORRECTION

PATENT NO. : 4,793,699

DATED : December 27, 1988

INVENTOR(S) : Mitsuhiro Tokuhara

It is certified that error appears in the above-identified patent and that said Letters Patent is hereby corrected as shown below:

COLUMN 8

Line 5, "mirrors arrays" should read --mirror arrays--.

COLUMN 9

Line 44, "$(I_{max}-I_{min})/I_{max}+I_{min})<0.05,$" should read --$(I_{max}-I_{min})/(I_{max}+I_{min})<0.05,$--.
Line 48, "pattern," should read --pattern.--.

COLUMN 10

Line 18, "lights" should read --light--.
Line 27, "light data" should read --light dots--.
Line 48, "an" should read --and--.

UNITED STATES PATENT AND TRADEMARK OFFICE
CERTIFICATE OF CORRECTION

PATENT NO.  : 4,793,699

DATED       : December 27, 1988

INVENTOR(S) : Mitsuhiro Tokuhara

It is certified that error appears in the above-identified patent and that said Letters Patent is hereby corrected as shown below:

Column 12

Line 12, "said receiving member" should read
　　　　　　　--said light receiving member--.

Signed and Sealed this

Sixth Day of March, 1990

Attest:

JEFFREY M. SAMUELS

*Attesting Officer*   Acting Commissioner of Patents and Trademarks